United States Patent [19]

Hall et al.

[11] Patent Number: 4,524,436
[45] Date of Patent: Jun. 18, 1985

[54] PRESSURE WAVE FIBER OPTIC TRANSDUCER CABLE

[75] Inventors: Robert L. Hall; Lowell T. Wood, both of Houston, Tex.

[73] Assignee: Schlumberger Technology Corporation, Houston, Tex.

[21] Appl. No.: 517,129

[22] Filed: Jul. 25, 1983

Related U.S. Application Data

[63] Continuation of Ser. No. 264,248, May 15, 1981, abandoned.

[51] Int. Cl.³ .......................... G02B 5/14; G01H 9/00; G01S 3/80
[52] U.S. Cl. .................................... 367/169; 367/154; 455/612
[58] Field of Search ............... 367/149, 154, 178, 169; 455/605, 612, 614; 350/96.15, 96.29; 73/406, 655; 250/227

[56] References Cited

U.S. PATENT DOCUMENTS

| | | | |
|---|---|---|---|
| 2,872,532 | 8/1955 | Birchman et al. | 367/181 |
| 4,294,513 | 10/1981 | Nelson et al. | 350/96.29 |
| 4,408,495 | 10/1983 | Couch et al. | 250/227 |
| 4,408,829 | 10/1983 | Fitzgerald et al. | 250/227 |
| 4,443,700 | 4/1984 | Macedo et al. | 250/247 |
| 4,449,210 | 5/1984 | Myer | 367/149 |

*Primary Examiner*—Nelson Moskowitz
*Attorney, Agent, or Firm*—H. N. Garrana

[57] ABSTRACT

A distributed microbending sensor cable is described comprising a core structure having discontinuities or ridges on its surface which ridges extend longitudinally of the core. An optical fiber is wrapped helically about the core in contact with the ridges with the adjacent contact points in one embodiment being a distance apart which is the distortion wave length of the selected optical fiber.

In a modification of the sensor cable the distance Λ between adjacent contact points is varied along the length of the sensor to impart a weighted characteristic to the sensor response.

6 Claims, 2 Drawing Figures

PRESSURE WAVE FIBER OPTIC TRANSDUCER CABLE

This is a continuation of application Ser. No. 264,248, filed May 15, 1981, now abandoned.

BACKGROUND OF THE INVENTION

1. Field of Invention

The present invention relates to pressure wave transducers and more particularly to a pressure wave sensor of significant length employing optical fibers and utilizing the principle of microbending.

2. The Prior Art

Pressure sensors or transducers of significant length are described in a number of U.S. Patents U.S. Pat. No. 2,965,877 describes a hydrophone with capacitive effect in which the capacitance between the two armatures of a capacitor varies in relation to the pressure applied to the sensor.

U.S. Pat. No. 3,317,891 also describes a hydrophone of continuous structure wherein the variation of resistance of conductors forming part of a sensor are converted to electrical signals.

Yet another elongated pressure wave transducer is described in U.S. Pat. No. 3,798,474 as being capable of measuring the pressure variations resulting from seismic vibrations either in the sea or on the earth and being of the piezoelectric type. This transducer consists of a long strip of flexible material having piezoelectric properties and the faces of which are each associated with an electric conductor.

Of course, the best known elongated pressure wave transducer in use today by commercial marine operators in seismic surveying consists of detector arrays or stations comprising a plurality of rigid hydrophone structures mounted within a cable with each array extending for 25 to 50 meters and numbering many individual hydrophones.

One characteristic common to all the foregoing transducers and arrays is the fact that they rely upon the use of or the generation of electrical energy, features which in the art characterize them as active transducer elements.

Recently a suggestion has been made, as represented by U.S. Pat. No. 4,115,753, to employ a fiber optic acoustic array using optical hydrophones which sense sound waves. The light signals so generated are transmitted along a fiber-optic bundle. As described in this patent each of the optical hydrophones is separately coupled to a separate one of the multitude of optical fibers. The sensed signal from each of the hydrophones is transmitted by way of its own optical fiber to a photodetector, there being a plurality of photo detectors each coupled to a corresponding hydrophone. This then amounts to an optical system equivalent to the more conventional data gathering systems in that each hydrophone has its own connection by way of an optical fiber to recording equipment on board a vessel.

SUMMARY OF THE INVENTION

The present invention marks a significant departure from prior art devices that heretofore have been recognized as continuous transducers or sensors in that the transducer is not only elongated but characterized as being a passive element employing principles of light and fiber optic technology.

More particularly there is provided an elongated multi-directional pressure sensor comprising an extended length of resilient supporting structure of substantially circular cross section havng an outer surface provided with discontinuities at predetermined points thereon. Fiber optic means extends along the length of the structure and in contact with the discontinuities. A pressure transmitting protective sheath encompasses the fiber optic means and the supporting structure so that pressure waves applied to the sensor will be transmitted by way of the pressure transmitting sheath to microbend the fiber optic means at each of the discontinuities to an extent representative of the amplitude of the pressure wave at any instant of time.

More particularly, the discontinuities comprise at least two ridges extending in substantially parallel fashion along the length of the supporting structure and the fiber optic means is provided by a single optical fiber wrapped in helical fashion about the supporting structure and in contact with the discontinuities.

In another aspect of the invention the lay angle of the helix formed by the optical fiber about the supporting structure is varied at selected positions along the sensor to impart weighting functions.

THE DETAILED DESCRIPTION

Figure 1:
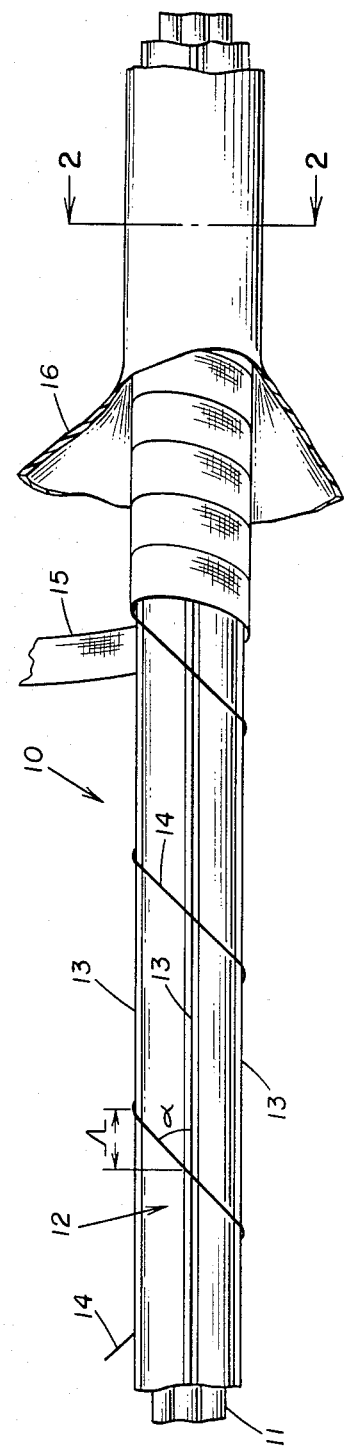
FIG. 1 illustrates a segment of the transducer or sensor cable with portions removed to depict the manner of construction.

Referring now to FIG. 1 there is illustrated a cable sensor 10 embodying the present invention. The cable sensor 10 is comprised of a strain member 11 about which is formed a core 12 having a plurality of surface discontinuities or ridges 13 equally spaced and substantially parallel to the core 12. Strain member 11 may be of metallic wire, Kevlar aramid fiber, or any other suitable flexible strength member or members. In contact with the ridges 13 of the core 12 is a fiber optic means which in the illustrated embodiment is comprised of a single optical fiber 14 wrapped in the form of a helix about the core 12. A fabric tape is wrapped about the core including the optical fiber 14 and the entire assembly is protected by a jacket 16.

Figure 2:
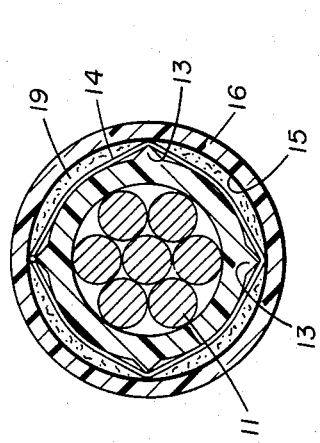
FIG. 2 is a cross-section of the transducer or sensor cable taken along line 2—2 of FIG. 1.

A cross section of the cable sensor 10 is illustrated in FIG. 2 depicting that there is a liklihood of a void existing between the tape 15 and the surface of the core 12. In such event the space 19 will be filled with a suitable material such as a polysulfide or gel.

In both FIGS. 1 and 2 the size of the ridges 13 has been exaggerated. In practice of the invention the ridges need not exceed 1 mm above the surface of the core 12.

In a preferred embodiment the strain member 11 is comprised of a number of steel wires in order to give support to the cable sensor as in one application it will be towed behind an exploration vessel in the conduct of a marine seismic survey. The core 12 is comprised of insulating material of hard durometer material such as teflon. The tape 15 can be of dacron and the jacket or sheath 16 again formed of a hard durometer material such as teflon.

The cable sensor 10 is responsive to the appearance of acoustic energy by changing the transmission characteristics of the optical fiber 14 at each point where the fiber crosses the discontinuities or ridges 13. More particularly the principle involved is known as microbending which effects an attenuation of light pulses transmitted along the optical fiber 14. The principles of operation of a sensor such as a hydrophone employing the microbend principle are more fully described in copending application Ser. No. 229,823 file Jan. 30, 1981, now U.S. Pat. No. 4,408,829, entitled "Fiber Optic Transducers" and assigned to the same assignee as the present application. In accordance with the operation of a microbend sensor, pulses of light are attenuated as pressure waves, typically acoustic waves, impinge upon the sensor cable 10. This occurs at each point where the optical fiber crosses one of the discontinuities or ridges 13. The attenuation can be represented as two phenomena one being the form of reflected energy which will travel back along the optical fiber 14 to a suitable light pulse detector and the other being the continued transmission of remaining energy along the length of the optical fiber which in employing other detecting techniques would amount to a measure of the transmissivity of the light energy.

The sensor cable 10 can be employed in conjunction with a system described in co-pending application Ser. No. 264,180 filed Nov. 15, 1981, now abandoned by Robert Hall and Robert Fitzgerald entitled "Data Acquisition System", assigned to the same assignee as the present application and filed concurrently herewith. In that system an optical time domain reflectometer applies time spaced bursts of light energy into an optical fiber such as the fiber 14. Light pulses will be modified at each location along the sensor 10 where microbending takes place in response to the impingement of a pressure wave and in an amount proportional to the instantaneous amplitude of the pressure wave. Because the points along the sensor cable 10 giving rise to reflection signals by reason of the microbending action are so closely spaced together the net effect at a detector is an effective summation of the attenuation signals resulting in a sensor of greater sensitivity.

The sensitivity of the distributed microbend transducer of the present invention is increased by optimizing the distance between contact points. It is well known that the class of refractive index profiles for a graded index fiber is described by the power law $$n^2(r) = N_o^2 \left[ 1 - 2\Delta \left( \frac{r}{a} \right)^2 \right]$$

where
$n_o$ = index at core center
$a$ = core radius
$r$ = any point along the radius, and $$\Delta = \frac{n_o^2 - n_1^2}{2n_o^2}$$

where
$n_1$ = index of refraction at the core-cladding interface

The electromagnetic modes in the wave guide described above may be associated into groups having a principal mode number m and a longitudinal propagation constant $B_m$. The difference $\delta B_m$ between adjacent mode number m and m+1 for graded index fiber is $$\delta B_m = \frac{2}{a} \frac{(\Delta)^{\frac{1}{2}}}{2} = \frac{(2\Delta)^{\frac{1}{2}}}{a} \quad (2)$$

According to equation (2), for parabolic profiles, adjacent mode groups are separated by a constant. Therefore a single distortion wavelength $\Lambda_c$ can couple all neighboring mode groups.

Converting equation (2) from wavenumber to wavelength there is obtained $$\Lambda_c = \frac{2\pi a}{(2\Delta)^{\frac{1}{2}}} \quad (3)$$

Utilizing an appropriate type graded index fiber the value of $\Lambda_c$ becomes 1.8 cm.

Therefore, any by way of further example, if there be a supporting core of 0.7 cm diameter and there are provided four (4) distortion ridges equally spaced about the circumference of the core, the lay angle of the helix to be formed by wrapping the fiber about the core can be obtained from the expression.

$$\Lambda_c = \frac{R_m \theta}{\sin \alpha} \quad (4)$$

where: $\theta = \frac{2\pi}{\# \text{ridges}}$ $\alpha$ = lay angle

The parameters above establish the lay angle to be 180°.

The distributed microbend sensor cable thus described is of uniform characteristics and maximum sensitivity. Other characteristics may be imparted to sensors of the present invention. For example it may be desired to weight the response of the sensor to provide an impulse response which would reject noise. Such a response would be provided by varying the value of $\Lambda_c$ at selected positions along the length of the sensor.

The sensor cable of the preferred mode may be fabricated by extruding over the strain member 11 the core 12 of teflon forming simultaneously the predetermined number of perturbations or ridges 13. In a following step the optical fiber 14 will be helically wrapped about the supporting core followed by a wrap 15 of dacron cloth. The space between the core 12 and the wrap 15 will be filled with low durometer material 19 as the wrap is being formed. Finally the jacket 16 is extruded over the assembly forming the final product.

The sensor cable can be of any desired effective length but preferably of the order of 100 feet.

It will be apparent to those skilled in the art in view of the above description of a preferred embodiment that other cable sensor designs may be implemented consistent therewith. For example the ridges 13 may be provided by circumferential rings about the core 12 spaced a distance $\Lambda$. In this instance in order to achieve the omnidirectional characteristics of the present invention a multiplicity of optical fibers, for example a minimum of three in number, would be extended longitudinally of the core 12 with microbending taking place at each point where the optical fibers cross the rings or circumferential ridges.

Likewise the ridges may be provided by forming a helical ridge about the core 12 with the distance between adjacent ridges of the helix being again a distance $\Lambda$. Once more in order to preserve the multidirectional sensitivity of the cable a plurality of optical fibers would be provided to extend longitudinally of the core 12.

In each of the two above described modifications the multiplicity of optical fibers could be coupled to a point back at a detector and transmitting point. On the other hand it might be desirable to employ a multiplicity of optical time domain reflectometers one for each optical fiber in which case each optical fiber would be connected to a separate source of light pulses and individual detectors.

Further modifications will now become obvious to those skilled in the art and are intended to be within the scope of the following claims.

What is claimed is:

1. A pressure sensor comprising:
   elongate optical fiber means for affording the transmission of light over an extended length,
   means for supporting said optical fiber means along length and for minimizing the stress applied to said optical fiber means that is not associated with the pressures to be sensed,
   at least two ridges extending in substantially parallel fashion along the length of said supporting means and said optical fiber is helically wound about said support means in contact with said ridges; and
   said at least two ridges are spaced from one another and said optical fiber forms a helical angle with said ridges such that the distance between adjacent contacts of the optical fiber and said ridges satisfies the relationship:

$$A = \frac{R_m \theta}{\sin \alpha}$$

where
A = arc length between contacts $$\theta = \frac{2}{\text{number of ridges}}$$

$R_m$ = radius of core
$\alpha$ = lay angle;
said ridges introducing a controlled microbending of said optic means at predetermined locations chosen to increase sensor sensitivity therealong upon the application of external pressure waves, so as to introduce modal coupling within the light energy being transmitted through said optical fiber means, which coupling corresponds to the intensity and duration of such pressure waves as are to be sensed, and
a protective jacket around and in contact with said optical fiber means, said protective jacket being constructed from a material affording a transmission of pressure therethrough.

2. The pressure sensor of claim 1 wherein the value of A varies along the length of said optical fiber to control the sensitivity of the pressure transducer at selected portions along its length.

3. The pressure sensor of claim 1 wherein A = 1.8 centimeters.

4. A pressure sensor comprising:
   an elongated support of substantially circular cross-section; an optical fiber helically wound about the elongated support;
   means for introducing a controlled microbending comprising at least two ridges extending in substantially parallel fashion along the surface of said support; and
   wherein the distance between adjacent contacts of the optical fiber and said ridges satisfies the relationship:

$$A = \frac{R_m \theta}{\sin \alpha}$$

where
A = arc length between contacts $$\theta = \frac{2}{\text{number of ridges}}$$

$R_m$ = radius of core
$\alpha$ = lay angle; and
said ridges introducing a controlled microbending of said optic fiber at predetermined locations therealong upon the application of external pressure waves, so as to introduce modal coupling within the light energy being transmitted through said optical fiber which coupling corresponds to the intensity and duration of such pressure waves; and
a protective jacket around and in contact with said optical fiber means, said protective jacket being constructed from a material affording a transmission of pressure therethrough.

5. The pressure sensor of claim 4 wherein the value of A varies along the length of said fiber to control the sensitivity of the pressure transducer at selected portions along its length.

6. The pressure sensor of claim 4 wherein A = 1.8 centimeters.

* * * * *